United States Patent
Anderson et al.

(10) Patent No.: US 9,887,785 B1
(45) Date of Patent: *Feb. 6, 2018

(54) RECEIVER ADAPTED FOR USE IN WIDEBAND PHASE SPECTRUM MEASUREMENTS

(71) Applicant: Keysight Technologies, Inc., Minneapolis, MN (US)

(72) Inventors: Keith F. Anderson, Santa Rosa, CA (US); Jean-Pierre Teyssier, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,084

(22) Filed: Jan. 15, 2016

(51) Int. Cl.
| | | |
|---|---|---|
| H04B 3/46 | (2015.01) | |
| H04B 17/00 | (2015.01) | |
| H04Q 1/20 | (2006.01) | |
| H04B 17/20 | (2015.01) | |
| H04B 1/16 | (2006.01) | |
| H04B 1/00 | (2006.01) | |

(52) U.S. Cl.
CPC ........... H04B 17/20 (2015.01); H04B 1/0007 (2013.01); H04B 1/16 (2013.01)

(58) Field of Classification Search
None
See application file for complete search history.

(56) References Cited

U.S. PATENT DOCUMENTS

| | | | |
|---|---|---|---|
| 8,891,639 B2 | 11/2014 | Bossche | |
| 9,654,124 B1* | 5/2017 | Anderson | ................. H03L 7/24 |
| 2004/0260506 A1* | 12/2004 | Jones | ........................ G01S 1/08 |
| | | | 702/150 |

OTHER PUBLICATIONS

U.S. Appl. No. 14/997,084, filed Jan. 16, 2016 Receiver Adapted for Use in Wideband Phase Spectrum Measurements.
U.S. Appl. No. 15/011,306, filed Jan. 29, 2016, Coherent Signal Source.
U.S. Appl. No. 15/085,702, filed Mar. 30, 2016, Method and Apparatus for Characterizing Local Oscillator Path Dispersion.
U.S. Appl. No. 15/009,309, filed Jan. 29, 2016 Method and System for Characterizing Phase Dispersion in Intermediate Frequency Channel of Receiver.
Yaagoubi, et al., Accurate Phase Measurements of Broadband Multitone Signals Using a Specific Configuration of a Large Signal Network Analyzer, IEEE, 2006, pp. 1448-1451.
Ko, et al., Multi-Harmonic Broadband Measurements Using an Large Signal Analyzer, IEEE, 2010. pages.

* cited by examiner

Primary Examiner — Chieh M Fan
Assistant Examiner — Gina McKie

(57) ABSTRACT

A receiver and method for using the same to generate phase spectra that are independent of the starting time of the sequence of digital measurements used to generate the phase spectra are disclosed. The receiver includes a first signal port adapted to receive a first test signal that includes a plurality of tones and a first ADC that generates one digital value from the first test signal in response to each clock pulse from an ADC clock. The first receiver also includes a phase clock register that includes a time stamp value that is incremented on each clock pulse from the ADC clock, and a processor that records a sequence of the digital values starting at a first time and the time stamp value at the first time.

13 Claims, 3 Drawing Sheets

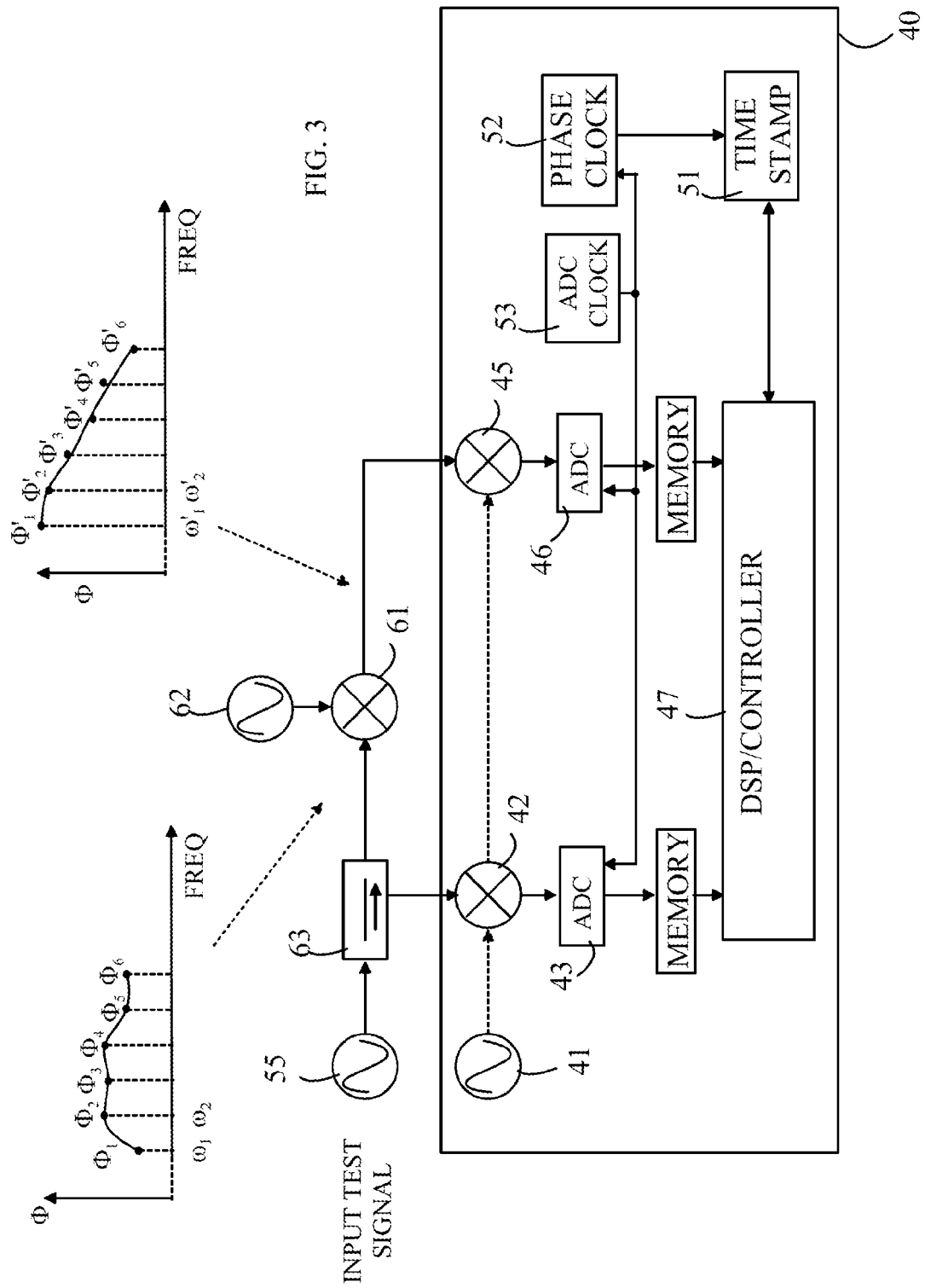

US 9,887,785 B1

RECEIVER ADAPTED FOR USE IN WIDEBAND PHASE SPECTRUM MEASUREMENTS

BACKGROUND

Many measurements of interest are generated by applying a repetitive signal to a device under test (DUT) and measuring the frequency response of the output of the DUT. In one common configuration, the output of the DUT is down converted in a mixer to an IF signal that is digitized by an analog-to-digital converter (ADC). The ADC output is then transformed using a Discreet Fourier transform such as a Fast Fourier transform (FFT) to provide a measurement of the amplitudes and phases of the tones in the output signal. The tones will be separated by a frequency that is determined by the repetition rate of the input signal. If the measurement is repeated, the amplitude of the tones and their frequencies will remain the same to within the experimental errors. Hence, spectra that depend only on the amplitude of the tones can be compared from time to time.

The phases of the tones as a function of frequency depend on the starting time of the sample sequence digitized by the ADC relative to some fixed starting point of the repetitive sequence. If this time changes, the phases as a function of frequency also change. Hence, comparing two phase measurements taken at different times presents significant challenges.

SUMMARY OF THE INVENTION

The present invention includes an apparatus having a first receiver that includes a first signal port adapted to receive a first test signal that includes one or more tones and a first ADC that generates one digital value from the first test signal in response to each clock pulse from an ADC clock. The first receiver also includes a phase clock register that includes a time stamp value that is incremented on each clock pulse from the ADC clock, and a processor that records a sequence of the digital values starting at a first time and the time stamp value at the first time.

In one aspect of the invention, the processor triggers a recording of another sequence of the digital values when the phase clock register has a predetermined value.

In another aspect of the invention, the processor generates a first phase spectrum from the sequence of the digital values starting at the first time and the time stamp value at the first time. The first phase spectrum includes a phase corresponding to each of the plurality of tones in the first test signal, and the first phase spectrum is independent of the first time.

In a further aspect of the invention, the apparatus includes a first mixer and a local oscillator (LO). The mixer down converts the first test signal using the LO prior to the first ADC generating the digital values.

In a still further aspect of the invention, the apparatus includes a second signal port adapted to receive a second test signal which includes a plurality of tones and a second ADC that generates one digital value from the second test signal in response to each clock pulse from the ADC clock. The processor generates a second phase spectrum from a sequence of the digital values starting at a second time and the time stamp value at the second time. The second phase spectrum includes a phase corresponding to each of the plurality of tones in the second test signal and is independent of the second time.

In another aspect of the invention, the apparatus includes a second mixer that down converts the second test signal using the LO prior to the second ADC generating the digital values. The processor generates a difference phase spectrum from the first and second phase spectra.

The present invention also includes a method for operating an apparatus having an ADC and an ADC clock to generate a first phase spectrum from a first input signal which includes one or more tones. The method includes generating a sequence of digital values from the first input signal starting at a first time, one of the digital values being generated by the ADC at each pulse of the ADC clock, storing a count of the pulses from the ADC clock, and recording the count at the first time. A first phase spectrum is generated from a sequence of digital values starting at the first time and the recorded count. The first phase spectrum includes a phase corresponding to each of the plurality of tones in the first test signal, and is independent of the first time.

In one aspect of the invention, the first input signal includes a plurality of tones and is down converted to a first IF signal prior to generating the sequence of digital values. The first IF signal is down converted by a first mixer that is driven by a mixer LO operating at a mixer LO frequency. In another aspect, the mixer LO frequency is chosen such that the first IF signal includes a first subset of tones from the first input signal, the first subset being less than the number of tones in the first input signal, and the first phase spectrum includes a phase corresponding to each of the tones in the first subset of tones.

In another aspect, the method also includes setting the mixer LO to a second mixer LO frequency to generate a second IF signal that includes a second subset of tones from the first input signal, the second subset being less than the number of tones in the first input signal. The second subset of tones includes one tone that was in the first subset of tones and one tone that was not in the first subset of tones. A second phase spectrum is generated from the second IF signal at a second time, the second phase spectrum is independent of the second time. The first and second phase spectra are combined to generate a third phase spectrum that includes phases for all of the tones in the first and second subsets of tones.

The present invention also includes a method for comparing the phase alterations in a multi-tone input signal introduced by a component that generates an output signal from the input signal, the output signal having a number of tones equal to that of the input signal. The component alters phases of the tones in the input signal. The method includes inputting first and second IF signals to an apparatus having a down converter, said method includes down converting the input signal to provide a first IF signal having an IF frequency range using the down converter, generating a first sequence of digital values from the first IF signal starting at a first time, and recording the first time. A first phase spectrum is generated from the first sequence of digital values and the first time, the first phase spectrum being independent of the second time. The method also includes down converting the output signal to provide a second IF signal having the IF frequency range using said down converter, generating a second sequence of digital values from the second IF signal starting at a second time, and recording the second time. A second phase spectrum is generated from the second sequence of digital values and the second time, the second phase spectrum being independent of the second time. The first and second phase spectra are then compared.

BRIEF DESCRIPTION OF THE DRAWINGS

FIG. 3 illustrates an example of a receiver in a vector network analyzer (VNA) that utilizes the time zero phase system of the present invention.

DETAILED DESCRIPTION

Figure 1:
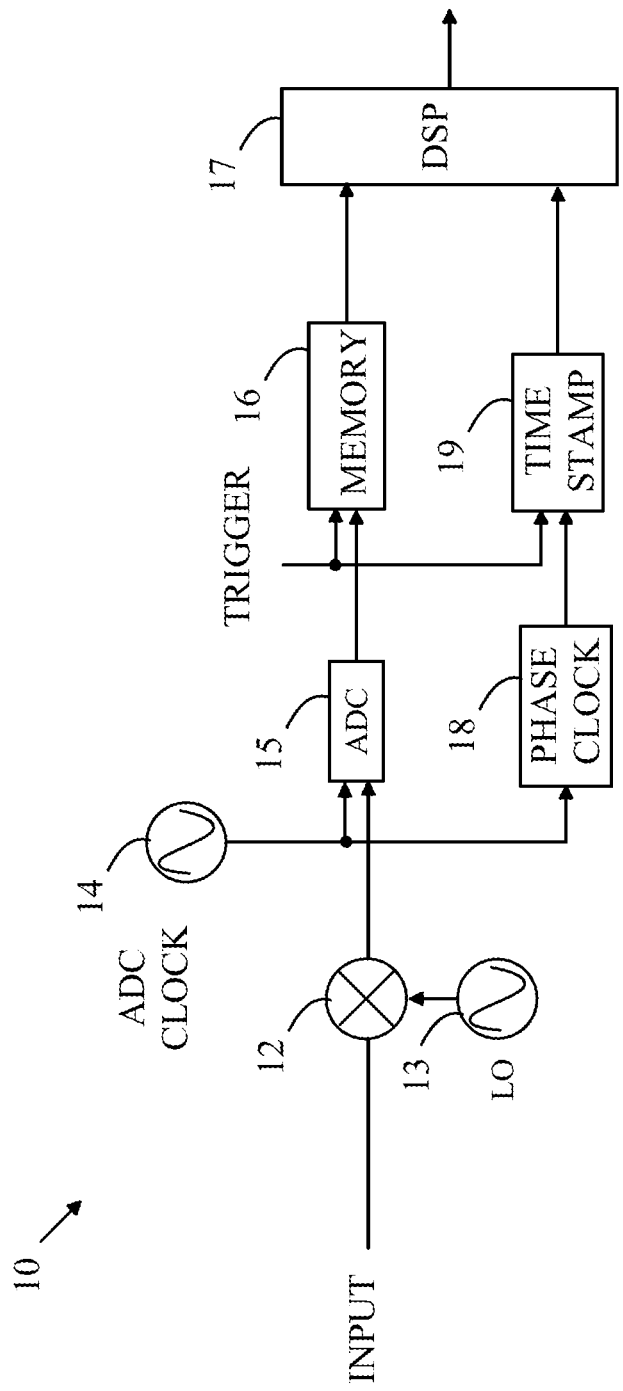
FIG. 1 illustrates a system for computing the amplitudes and phases of an input signal over a range of frequencies.

In many measurement systems, the goal is to characterize the effect of a DUT on an input signal. To accomplish such tests, a repetitive signal is input to the DUT and the amplitude and phase of the component frequencies in the input signal are measured at the output of the DUT. A test that involves measuring the alteration of the phase of each input tone by the DUT presents significant challenges unless the input signal and output signal from the DUT are measured at the same time. Any repetitive signal, $S(t)$, can be represented by a multi-tone signal of the form $$S(t) = A_0 + \Sigma A_k \cos(k\omega t + \theta_k) \quad (1)$$

where $A_k$ is the amplitude of the $k^{th}$ tone, $\theta_k$ is the phase of the $k^{th}$ tone and $k\omega$ is the frequency of that tone. Consider the measurement of S in a system in which the time coordinates are offset by an amount $t_0$ relative to system in Eq. (1). Denote time in the new system by $t'$. Here, $t' = t - t_0$.

$$S(t') = A_0 + \Sigma A_k \cos(k\omega(t' + t_0) + \theta_k) = A_0 + \Sigma A_k \cos(k\omega(t') + \Phi_k) \quad (2)$$

where $$\Phi_k = k\omega t_0 \theta_k \quad (3)$$

Here, $\Phi_k$ is the phase that would be measured in the new time system. From the equation above, it is clear that the amplitudes of the tones do not depend on the choice of the $t=0$ point in time, but the phases do. Consider the case in which all $\theta_k$ are 0. That is, in the original time coordinate system, $\theta$ as a function of k is 0. In the new coordinate system, the phases, $\Phi_k$ now are a linear function of k.

Consider a simple experiment in which S(t) is applied to a DUT and the output of the DUT is analyzed by a receiver in which the output signal from the DUT is digitized to form a sequence of time samples that are then transformed by an FFT to obtain a spectrum having amplitudes and phases of the tones in the output signal. To simplify the discussion, it will be assumed that the input signal is chosen such that $\theta_k$ is 0 for all k and that all $A_k$ values are known. It will also be assumed that the output of the receiver is converted to a time signal of the form $$S'(t') = \Sigma A'_k \cos(k\omega(t') + \Phi'_k) \quad (4)$$

Here, again, $t = t' - t_0$. That is, the time frame of the system that measures the signals leaving the DUT is shifted by an amount $t_0$. Assume that the phase change as a function of frequency that is introduced by the DUT is to be determined. Denote the DUT induced phase change in the $k^{th}$ tone by $Q_k$. Again, it will be assumed that the input signal was chosen such that all of the phases in the input signal are 0. Then $$\Phi'_k = k\omega t_0 + Q_k \quad (5)$$

Hence, even though $\theta_k$ is known and equal to 0, and the values of the phases in the signal from the DUT are measured, the value of $Q_k$ cannot be obtained from the receiver output unless $t_0$ is known or $\omega t_0$ is a multiple of 360 degrees. The quantity $\omega t_0$ is referred to as the phase slope in the following discussion. If the two signals are measured at the same time, then $t_0 = 0$. However, in many cases of interest, the value of $t_0$ in the receiver is not known. That is, the time at which the first sample that is used in the Fourier transformed sequence is measured is not known relative to the time the input signal to the DUT had some predetermined phase.

For some measurements, the lack of knowledge with respect to $t_0$ does not prevent the information of interest from being obtained. For example, if the attenuation of the signal as a function of frequency is the goal, the output of the receiver together with a knowledge of the input signal amplitudes is sufficient. In some measurements, the goal is to determine the extent to which the $Q_k$ are constant as a function of k. In this case, a plot of the $\Phi_k$ as a function of k is sufficient. If the plot is a line, then the $Q_k$ were constant as a function of K.

Consider a series of measurements made in which $t_0$ is not known. Each set of measurements will have a different associated $t_0$ value. Hence, $k\omega t_0$ value for any given set of measurements will be different from that of every other set of measurements. This variation makes it difficult to gain insight into the values of the $Q_k$ between measurements. Accordingly, various schemes for converting the measured phases into "normalized" phases in which the variations due to the variations in $t_0$ between measurements are suppressed have been put forward. In principle, the normalized phases as a function of frequency can then be compared to one another without the distortion introduced by the $t_0$ term discussed above.

The normalization procedure has two parts. First, a phase value is subtracted from all of the phases. In one example, the value of $\Phi_1$ is subtracted from each of the measured phases, so that the first component of the normalized phases is always zero. However, in other schemes, the phase at the mid point, last point, or the average of all phases, is subtracted.

Next, an approximation to $\omega t_0$ is computed from the measured phases. Note that in the simple case in which the $Q_k$ are constant, $\omega t_0$ is the slope of the $\Phi_k$ as a function of k. Denote this approximation by W. The normalized phases are obtained from the offset phases by subtracting a phase equal to $(k-1)W$ from the $k^{th}$ offset phase.

$$\Phi'_k = \Phi_k - \Phi_1$$

$$\Phi''_k = \Phi'_k - (k-1)*W \quad (6)$$

Here, the $\Phi'_k$ are offset phases, and the $''_k$ are the normalized phases. This procedure assumes that a good approximation to W can be obtained from the measured phases. If the variation of the $Q_k$ with k is relatively small, fitting the $\Phi_k$ to a straight line will provide a reasonable approximation to W, the slope of that line being W. However, in many cases of interest, that assumption is not valid.

The present invention is based on the observation that in systems in which two sets of measurements are made at different times, the starting time, $t_0$, in the second system cannot be determined accurately relative to the starting time in the first system. The present invention avoids this problem by providing a time standard that is the same for each set of measurements thereby allowing the phase in both sets of measurements to be computed independent of the time difference between starting times of each set of measurements.

Refer now to FIG. 1, which illustrates a system for computing the amplitudes and phases of an input signal over a range of frequencies. An input signal to be measured is down converted by mixer 12 using LO 13 to an IF frequency that is input to ADC 15 which samples the IF at a frequency determined by ADC clock 14. At the start of the measurement, a trigger signal causes memory 16 to store the successive samples from ADC 15 in memory 16. The trigger signal also causes the output of phase clock 18 to be captured as a time stamp 19. The values in memory 16 and the time stamp are processed by digital signal processor (DSP) 17 to provide the amplitude and phases of the IF signal at the various IF frequencies. Phase clock 18 is incremented on each pulse from ADC clock 14. Phase clock 18 is a register that is reset prior to any measurements being made and continues to accumulate counts as long as measurements that are to be compared are made. Hence, the register must be sufficiently long to ensure that phase clock 18 does not overflow.

Consider the case in which the signal to be measured is a sinusoid $v1(t)=A_1 \cos(\omega_1 t+\theta_1)$. The ADC and DSP will measure the phase of the IF signal at some time $t_1$ to provide $\Phi_1(t_1)=\omega_1 t_1+\theta_1$. That time is captured by the time stamp of the phase clock. Hence, define a time zero phase by $\Phi_1(0)=\omega_1 t_1+\theta_1-\omega_1 t_1=\theta_1$. The time, $t_1$, can be computed from the time stamp time, Ts, and the frequency of the ADC clock, F.

$$t_1=Ts/F \quad (7)$$

The time zero phase is always the same independent of $t_1$.

The manner in which the time zero phase according to the present invention can be used to improve a number of measurements that depend on phase measurements taken at different times will now be discussed in more detail.

The present invention provides significant improvements in systems that utilize "stitching" to piece together a spectrum for a test signal that has much greater bandwidth than that of the receiver. Consider a case in which the input to mixer 12 shown in FIG. 1 has a bandwidth that is much larger than the bandwidth that can be measured in system 10 from one sequence of ADC values. For example, the input signal could have a bandwidth of 100 MHz while DSP 17 can only generate a signal having a bandwidth of 20 MHz. The goal of the system is to generate a spectrum covering the entire 100 MHz range from a number of components measured 20 MHz spectra. In conventional analyzers, the receiver would measure six or more overlapping spectra by varying the frequency of LO 13. Each component spectrum would have a bandwidth of 20 MHz and a frequency range that would partially overlap that of a neighboring component frequency. While combining the component amplitude spectra is straightforward, stitching together the phases to provide a phase as a function of frequency that could have been obtained from a single 100 MHz receiver presents significant challenges, because each component spectrum has a different $t_1$ value and corresponds to a different LO frequency which introduces another phase of offset.

In the prior art the component spectra are chosen such that the spectra overlap one another in a manner in which a known frequency component is present in both spectra. The overlapped data is then used to calculate the relative phase offset of the two component spectra and the relative starting times for the component spectra. One problem with this technique is that measurement noise can cause errors in the alignment. To reduce the errors, the overlap areas must be very large, which increases the number of component spectra that must be utilized to span the desired frequency range.

Figure 2:
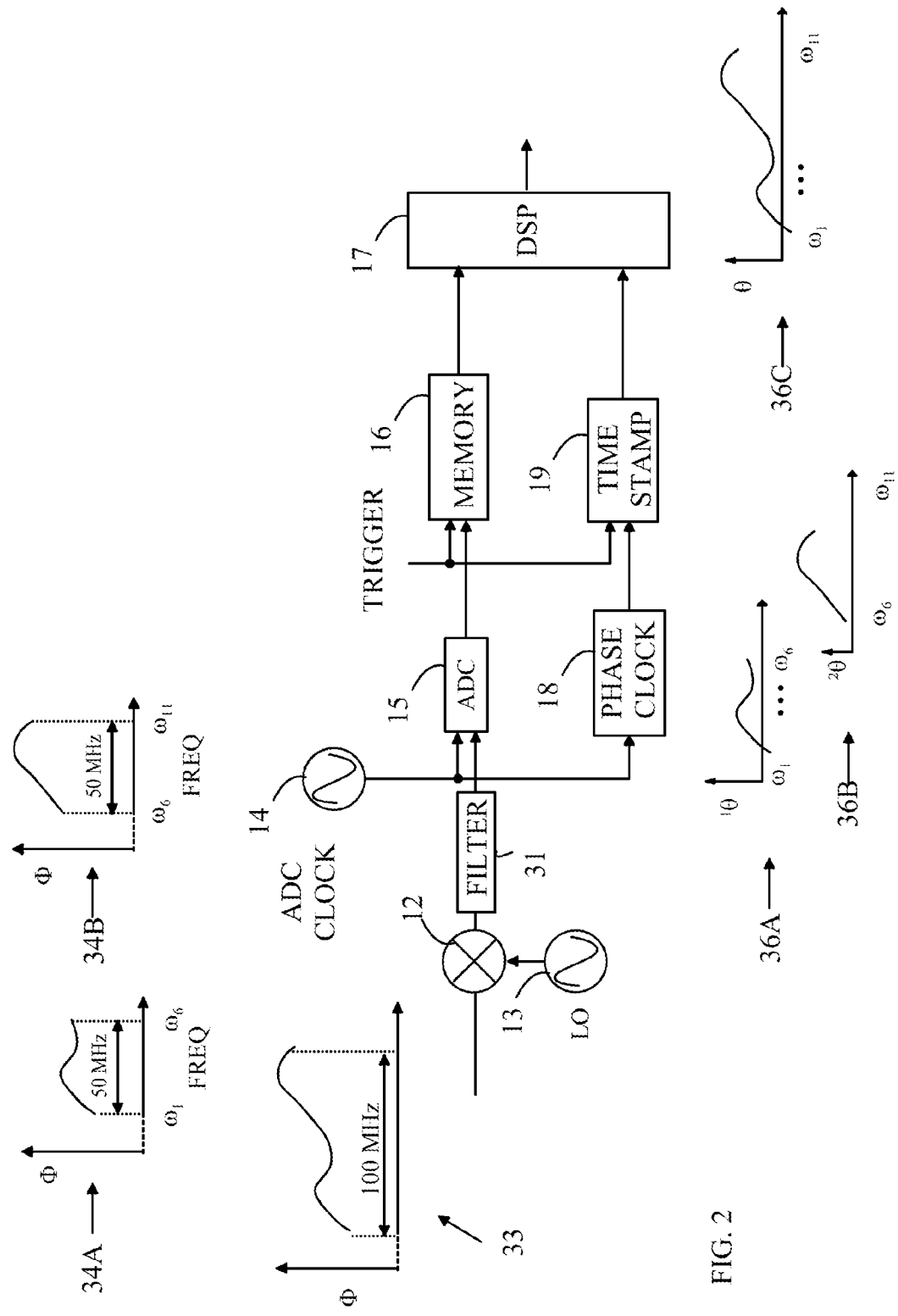
FIG. 2 illustrates the manner in which a receiver that utilized the time zero phase system according to the present invention can be used to perform a spectrum stitching measurement.

Refer now to FIG. 2, which illustrates the manner in which a receiver that utilized the time zero phase system according to the present invention can be used to perform a spectrum stitching measurement. To simplify the following discussion, the present example requires only two component spectra to provide a stitched spectrum; however, it will be apparent from this example that the procedure can be expanded to provide for stitching many more component spectra. Once again, the amplitude spectra have been omitted from the drawing; however, it is to be understood that there is a corresponding amplitude spectrum for each of the phase spectra discussed here.

For the purposes of this example, an input signal having a 100 MHz frequency band of interest is assumed as shown at 33. It will be assumed that there are 11 tones of interest, $\omega_1$ through $\omega_{11}$, in this input signal. This repetitive signal is input to mixer 12 which uses LO 13 and filter 31 to down convert the spectrum to a first component IF signal shown at 34A. The frequency of LO 13 is set by DSP 17 that also acts as the controller for the system. Component spectrum 34A includes tones $\omega_1$ through $\omega_6$ and has a bandwidth of approximately 50 MHz. This IF signal is digitized by the receiver in the manner discussed above to generate a first time zero phase spectrum, $^1\theta_i$, for I=1 to 6. Here, $^1\theta_i=^1\Phi_i(t_1)-(\omega_i*Ts/F)$, where $^1\Phi_i(t_1)$ is the $i^{th}$ phase generated by the FFT of the sequence of ADC measurements that started at the time Ts recorded in the time stamp of the phase clock at the start of the measurement. The first time zero spectrum is shown at 36A in FIG. 2.

After time zero phase spectrum 36A has been generated, DSP 17 sets the frequency of LO 13 such that a time zero phase spectrum, $^2\theta_i$, spanning tones $\omega_6$ through $\omega_{11}$ is obtained as shown at 36B from the second portion of the input signal shown at 34B. As noted above, the switching of the LO frequency introduces an unknown phase shift that results in a constant phase being added to each component of the second time zero phase spectrum; hence, the two time zero spectra do not coincide at $\omega_6$. Since the two spectra must match at $\omega_6$, this LO induced phase shift can be corrected by adding a fixed phase to each of the phase in the second spectrum, the fixed phase being equal to the difference between the two spectra at $\omega_6$ to obtain the spliced phase zero spectrum shown at 36 C which is output by DSP 17. It should be noted that the spliced phase zero spectrum still differs from the original phase spectrum by a constant phase that depends on the relationship between the start of the repetitive input signal to mixer 12 and the timing of the trigger signals.

In the above-described embodiment, the higher tone segment is stitched to the lower tone segment. However, the order in which the two component signals are stitched can be varied. For example, the higher frequency signal can be kept as the growing component with each lower frequency segment being added to that component.

The time zero phase system of the present invention can enable new functions in existing types of instruments. Consider a VNA. A two or more port VNA includes a number of mixers that are driven by the same LO. Two of the mixers receive inputs from the signals associated with each port. The output of each mixer is processed by a corresponding ADC. The outputs of the ADCs are analyzed to provide frequency and phase information with respect to signals at the ports in question. At any given time, the down conversion provided by the mixers must be the same, as all of the mixers utilize the same LO. This limitation makes measurements in which the different ports require different down conversion challenging, since the measurements must be done at different times to allow the LO to change frequencies. The requirement of making the measurements at different times poses challenges for a conventional VNA when the phase spectra of the two signals are to be compared.

Refer now to FIG. 3, which illustrates an example of a receiver in a VNA that utilizes the time zero phase system of the present invention. VNA 40 is configured to provide data for characterizing a mixer 61. The goal of the measurements is to compare the changes in phase of an input signal that are introduced by mixer 61 as a function of frequency. This is accomplished by using mixer 61 to down convert the input signal to a desired IF range using LO 62. To make the phase comparison, both the input signal and the output signal from the mixer must be down converted to the same frequency band so that the VNA can generate a phase spectrum for each signal and compare the phases at the various frequencies. It will be assumed that the final frequency range is much less than that of the output of mixer 61. Since mixer 61 has already partially down converted the signal, the remaining down conversion that must be provided by mixer 45 and ADC 46 in VNA 40 is less than the down conversion provided by mixer 42 to bring the input signal into the desired range. However, both mixers are driven by a common LO 41 in a VNA. Hence, either a LO must be added to the VNA so that the mixers can down convert the signals at the same time, or the measurements must be made at different times. Adding a second LO involves a significant increase in cost for the VNA. Making the measurements at different times in a conventional VNA introduces the phase spectrums discussed above. By using the zero phase system of the present invention, the measurements at different times can be carried out without the phase problems in question.

In this arrangement shown in FIG. 3, a multi-tone test signal 55 is split by coupler 63 into a first signal that is input to mixer 61, the second signal is input to a port of VNA 40. An LO 62 down converts this test signal to a second multi-tone signal having different same inter-tone spacing. This down-converted signal is input to a second port of VNA 40. The signal's input to the input ports of VNA 40 are converted using a single LO 41. The input signal from coupler 63 is down converted using mixer 42 and LO 41 is set to a first frequency. The output of mixer 42 is digitized by ADC 43 and converted to a frequency spectrum DSP/controller 47. DSP/controller 47 reads the time stamp 51 generated by phase clock 52 from ADC clock 53 at the start of the measurements that are converted to the phase spectrum. The phase spectrum generated from the ADC measurements is converted to a time zero phase spectrum in the manner discussed above.

After the input signal phase spectrum is generated, the frequency of LO 41 is changed and the output of mixer 45 is digitized in a similar manner to that of mixer 42. DSP/controller 47 reads time stamp 51 at the beginning of the measurements and converts the final digitized measurement to a time zero phase spectrum. Since the two time zero phase spectra are independent of the time at which the signals were measured, the two time zero phase spectra differ by at most a constant phase shift and the differences in phase shifts that were introduced by mixer 61. Accordingly, the two time zero phase spectra can be subtracted from one another to provide a measure of the phase shifts introduced by mixer 61 as a function of frequency.

It should be noted that the changes required in a conventional VNA are much less expensive than adding an additional LO. The conventional VNA need only be supplemented with phase clock 52 and an interface to read that clock, i.e., time stamp 51. In addition, the phase spectra software would need to be updated to provide the time zero phase conversions.

Characterizing a long cable presents another technical problem in which two phase spectrums must be compared. In the case of a long cable or an antenna range, the test ports of the DUT are very far apart, and hence, measuring the transmission phase through the system presents challenges. In this case, the LOs for the down conversion are the same; however, the distance effectively requires that two different receivers be used, one at each end of the transmission link. In this case, the signals are not measured at the same time at each end of the transmission link. In addition, building signal sources and receivers over very wide bandwidths, e.g. 10 GHz, presents additional challenges. The limited receiver bandwidth problems can be overcome by using stitching as described above.

In the prior art, the two receivers do not share a common synchronous trigger. As a result, the receivers measure their respective signals at different times, and the electrical delay through the transmission link cannot be measured. The present invention provides a mechanism for overcoming this problem. If the input and output receivers generate time zero spectra by using a phase clock time stamp, then the measurements will be time-independent; and hence, a synchronous trigger is not needed between the two widely separated receivers. Using a receiver according to the present invention, the two receivers are connected directly to one another at a single location and the differences in phase between the input and output phases is determined. This difference is then used to correct all future measurements. The two receivers are then separated and the measurements made. The receiver at the input end of the transmission link must communicate the time stamp at the beginning of its measurements to the receiver at the receiving end of the transmission link.

The clock register of the present invention can also be used to align measurements of the same signal that are performed at different times so as to allow those measurements to be compared, averaged, or otherwise processed. Consider a modulated RF signal where the modulation repeats at a rate of $F_{mod}$ and assume that $F_{clk}$ is an integer multiple of $F_{mod}$, the ADC clock frequency. The RF signal is down converted to an IF signal and digitized using an ADC according to the present invention to provide a sequence of digital values beginning at the time stamp at which the measurement is triggered. The sequence will always begin on a boundary of the ADC clock. The measurement will end $F_{clk}/F_{mod}$ samples later. Now suppose one wants to make a second measurement of the signal at some later time. Since the clock has not been reset, one can compute the clock time stamp at which the signal will be next repeated, i.e., the time stamp of the first measurement+$MN/F_{clk}$, where M is some integer. Hence, if the next measurement starts at such a time, a second measurement of the signal that can be added to the first measurement or compared to the first measurement can be obtained by triggering the measurement at a predetermined time stamp value. In this case, the measurement trigger is generated by the controller when the timestamp has a predetermined value.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising:
a first receiver comprising:
a first signal port adapted to receive a first test signal having one or more tones;
a first ADC that generates one digital value from said first test signal in response to each clock pulse from an ADC clock;
a phase clock register that includes a time stamp value that is incremented on each clock pulse from said ADC clock; and
a processor that records a sequence of said digital values starting at a first time and said time stamp value at said first time.

2. The apparatus of claim 1 wherein said processor triggers a recording of another sequence of said digital values when said phase clock register has a predetermined value.

3. The apparatus of claim 1 wherein said processor generates a first phase spectrum from said sequence of said digital values starting at said first time and said time stamp value at said first time, said first phase spectrum comprising a phase corresponding to each of said tones in said first test signal, said first phase spectrum being independent of said first time.

4. The apparatus of claim 3 further comprising a first mixer and a local oscillator, said first mixer down converting said first test signal using said local oscillator prior to said first ADC generating said digital values.

5. The apparatus of claim 4 further comprising:
a second signal port adapted to receive a second test signal comprising one or more tones; and
a second ADC that generates one digital value from said second test signal in response to each clock pulse from said ADC clock,
said processor generating a second phase spectrum from a sequence of said digital values starting at a second time and said time stamp value at said second time, said second phase spectrum comprising a phase corresponding to each of said tones in said second test signal, said second phase spectrum being independent of said second time.

6. The apparatus of claim 5 further comprising a second mixer that down converts said second test signal using said local oscillator prior to said second ADC generating said digital values.

7. The apparatus of claim 6 wherein said processor generates a difference phase spectrum from said first and second phase spectra.

8. A method for operating an apparatus having an ADC and an ADC clock to generate a first phase spectrum from a first input signal having one or more tones, said method comprising:
generating a sequence of digital values from said first input signal starting at a first time using said ADC, one of said digital values being generated at each pulse of said ADC clock;
storing a count of said pulses from said ADC clock;
recording said count at said first time;
generating said first phase spectrum from a sequence of digital values starting at said first time and said recorded count, said first phase spectrum comprising a phase corresponding to each of said tones in said first test signal, said first phase spectrum being independent of said first time.

9. The method of claim 8 further comprising down converting said first input signal to a first IF signal prior to generating said sequence of digital values.

10. The method of claim 9 wherein said first IF signal is down converted by a first mixer that is driven by a mixer LO operating at a mixer LO frequency.

11. The method of claim 10 wherein said first input signal comprises a plurality of tones and wherein said mixer LO frequency is chosen such that said first IF signal includes a first subset of said tones from said first input signal, said first subset of tones having fewer tones than said first input signal, said first phase spectrum comprising a phase corresponding to each of said tones in said first subset of tones.

12. The method of claim 11 further comprising:
setting said mixer LO to a second mixer LO frequency to generate a second IF signal that includes a second subset of tones from said first input signal, said second subset of tones having fewer tones than said first input signal, said second subset of tones including one tone that was in said first subset of tones and one tone that was not in said first subset of tones;
generating a second phase spectrum from said second IF signal at a second time, said second phase spectrum being independent of said second time; and
combining said first and second phase spectra to generate a third phase spectrum that includes phases for all of said tones in said first and second subsets of tones.

13. A method for comparing the phase alterations in a multi-tone input signal introduced by a component that generates an output signal from the input signal, the output signal having a number of tones equal to that of the input signal, the component altering phases of the tones in the input signal, the method inputting first and second IF signals to an apparatus having a first mixer and a second mixer, said first and second mixers utilizing a common LO generator, said method comprising:
down converting said multi-tone input signal to provide a first IF signal having an IF frequency range using said first mixer and said LO generator;
generating a first sequence of digital values from said first IF signal starting at a first time;
recording said first time;
generating a first phase spectrum from said first sequence of digital values and said first time, said first phase spectrum being independent of said first time;
down converting said output signal to provide a second IF signal having said IF frequency range using said second mixer and said LO generator;
generating a second sequence of digital values from said second IF signal starting at a second time;
recording said second time;
generating a second phase spectrum from said second sequence of digital values and said second time, said second phase spectrum being independent of said second time; and
comparing said first and second phase spectra.

* * * * *